United States Patent

Hörold et al.

[11] Patent Number: 5,959,043
[45] Date of Patent: *Sep. 28, 1999

[54] PHOSPHORUS-CONTAINING DICARBOXYLIC REACTION PRODUCT OF EPOXY RESINS AND PHOSPHORUS ACID (ANHYDRIDE) WITH HARDENER

[75] Inventors: Sebastian Hörold, Erftstadt; Hans-Jerg Kleiner, Kronberg, both of Germany

[73] Assignee: Clariant GmbH, Frankfurt, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/827,435

[22] Filed: Mar. 27, 1997

[30] Foreign Application Priority Data

Apr. 1, 1996 [DE] Germany .............. 196 13 064

[51] Int. Cl.⁶ .......... C08G 59/14; C08L 63/02; C08L 63/04
[52] U.S. Cl. .......... 525/533; 523/457; 523/466; 525/327.3; 525/423; 525/508; 525/485; 528/108
[58] Field of Search .......... 528/108; 525/327.3, 525/423, 508, 523, 533, 485; 523/457, 466

[56] References Cited

U.S. PATENT DOCUMENTS

| | | | |
|---|---|---|---|
| 3,236,863 | 2/1966 | Smith . | |
| 3,334,110 | 8/1967 | Schramm | 260/307 |
| 3,477,982 | 11/1969 | Dijkstra et al. | 260/37 |
| 4,127,590 | 11/1978 | Endo et al. | 260/346.74 |
| 4,280,951 | 7/1981 | Saito et al. | 528/108 |
| 4,289,812 | 9/1981 | Martin | 427/379 |
| 5,364,893 | 11/1994 | von Gentzkow et al. | 523/429 |

FOREIGN PATENT DOCUMENTS

| | | |
|---|---|---|
| 2158361 | 9/1994 | Canada . |
| 2141258 | 7/1995 | Canada . |
| 2159177 | 4/1996 | Canada . |
| 0384939 | 9/1990 | European Pat. Off. . |
| 412425 | 2/1991 | European Pat. Off. . |
| 665237 | 1/1995 | European Pat. Off. . |
| 0665237 | 8/1995 | European Pat. Off. . |
| 1745796 | 3/1972 | Germany . |
| 2757733 | 7/1978 | Germany . |
| 29 20 718 | 11/1979 | Germany . |
| 3540524 | 5/1987 | Germany . |
| 4308185 | 9/1994 | Germany . |
| 6-80765 | 3/1994 | Japan .............. 528/108 |
| 6-179756 | 6/1994 | Japan . |
| 1031369 | 6/1966 | United Kingdom . |

OTHER PUBLICATIONS

*Lackkunstharze* (Wagner/Sarx), 5th ed., Carl Hanser Verlag (1971), pp. 174–194.

Bald, G., et al, *Angewandte Makromol. Chem.* 44:151–163.

*Primary Examiner*—Robert E. Sellers
*Attorney, Agent, or Firm*—Miles B. Dearth

[57] ABSTRACT

The invention relates to a flame-resistant epoxy resin mixture comprising epoxy resins, phosphorus-containing compounds and a hardener, which comprises a phosphorus-containing compound of the formula I or II

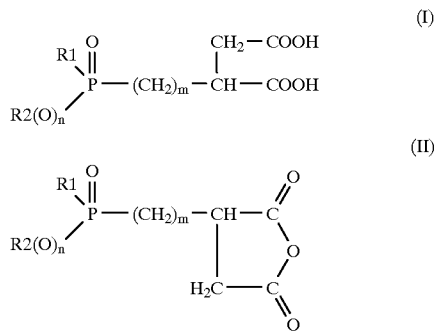

in which R1 and R2 are identical or different and are a straight-chain or branched alkyl radical of 1 to 8 carbon atoms, a cyclohexyl, cyclopentyl or aryl radical or an alkyl- or alkoxy-substituted alkyl radical of 1 to 18 carbon atoms, it also being possible for R1 and R2, together with the P atom, to form a ring, and m and n are 0 or 1, to a process for their preparation and to their use.

8 Claims, No Drawings

PHOSPHORUS-CONTAINING DICARBOXYLIC REACTION PRODUCT OF EPOXY RESINS AND PHOSPHORUS ACID (ANHYDRIDE) WITH HARDENER

The present invention relates to phosphorus-modified epoxy resin mixtures comprising epoxy resins, phosphorus-containing compounds and a hardener (curing agent), to a process for their preparation and to their use.

Epoxy resins are nowadays employed to produce molding compositions and coatings having good thermal, mechanical and electronic properties. They are suitable for the encapsulation of electrical and electronic components and for soak and impregnation processes. In electrical engineering, the epoxy resin molding compositions used are predominantly given a flame-resistant treatment. Epoxy resin molding compositions are generally treated for flame resistance using bromine-containing aromatic compounds, especially tetrabromobisphenol A. If exclusively brominated flameproofing agents are employed, then a bromine content of about 20% is required in order to ensure that the molding compositions are self-extinguishing. As a synergist, antimony trioxide is frequently used. In the event of fire, hydrogen bromide is given off, which may lead to corrosion damage. Under adverse conditions it is also possible for polybrominated diben-zodioxines and furans to be formed. There is therefore a need for epoxy resin molding compositions which achieve the required flame resistance without the addition of brominated compounds.

For the flame-resistant treatment of epoxy resin molding compositions, fillers having an extinguishing effect, such as aluminum oxide hydrate (DE 35 40 524 A1), have been proposed. Moreover, the addition of ammonium polyphosphate, alone or in combination with aluminum oxide hydrate, makes it possible to obtain sufficient flame resistance. Instead of ammonium polyphosphate, red phosphorus can also be used (DE 17 45 796 A1).

A disadvantage of all flameproofing agents present as filler is that the materials obtained are not transparent. Numerous liquid organophosphorus compounds have already been proposed as flame-retarding plastics additives. A disadvantage with these systems, however, is the pronounced "plasticizer effect" of these additives. In the case of cured epoxy resins, the plasticizing effect is manifested in a sharp reduction in the glass transition temperature.

The flame-resistant treatment of epoxy resins with epoxide-functional phosphonic esters has already been described (EP 0 384 939 A1). A disadvantage with these systems is the high complexity of synthesis of such phosphonic esters. Also known in the literature are phosphorus-modified epoxy resins which are obtained by reacting polyepoxide compounds with anhydrides of phosphonic acids or phosphinic acids and which are notable for their flame resistance properties (DE 43 08 185 A1). Easier to obtain industrially than phosphonic anhydrides are phosphorus-containing dicarboxylic acids or phosphorus-containing carboxylic anhydrides, which are used, for example, for the flameproofing of polyester fibers (US 4,127,590 A1).

The object of the invention was to provide phosphorus-modified epoxy resin mixtures which have good flame resistance properties, are simple and inexpensive to prepare, and allow for variation of the phosphorus content.

This object is achieved by means of phosphorus-containing epoxy resin mixtures of the type described at the outset, which comprise a phosphorus-containing compound of the formula I or II

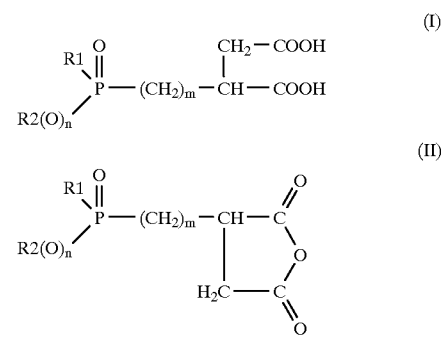

in which R1 and R2 are identical or different and are a straight-chain or branched alkyl radical of 1 to 8 carbon atoms, a cyclohexyl, cyclopentyl or aryl radical or an alkyl- or alkoxy-substituted alkyl radical of 1 to 18 carbon atoms, it also being possible for R1 and R2, together with the P atom, to form a ring, and m and n are 0 or 1.

The flame-resistant epoxy resin mixture preferably contains from 10 to 100 parts by weight of phosphorus-containing compounds of the formula I or II per 100 parts by weight of epoxy resin, and the overall weight ratio of epoxy resin and phosphorus-containing compound of formula I or II to hardener is (1 to 10) to 1.

The flame-resistant epoxy resin mixture is preferably free from halogen.

The flame-resistant epoxy resin mixture preferably contains from 5 to 300 parts by weight of phosphorus-free epoxy resins.

The flame-resistant epoxy resin mixture preferably contains from 5 to 300 parts by weight of further ingredients and/or fillers.

The flame-resistant epoxy resin mixture preferably contains from 0.5 to 13% by weight of phosphorus.

The flame-resistant epoxy resin mixture particularly preferably contains from 1 to 6% by weight of phosphorus.

The flame-resistant epoxy resin mixture preferably contains an accelerator.

The flame-resistant epoxy resin mixture preferably contains a compound of the formula III

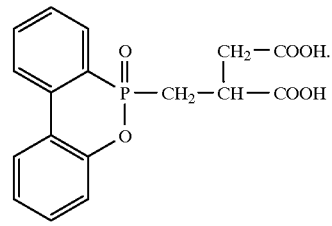

The invention likewise relates to a process for preparing flame-resistant epoxy resin mixtures comprising epoxy resins, phosphorus-containing compounds and a hardener, which in a first reaction step comprises reacting an epoxy resin with a phosphorus-containing compound of the formula I or II and then, in a second reaction step, comprises converting the reaction product into the flame-resistant epoxy resin mixture, with a hardener.

The first reaction step preferably takes place in a solvent. Aprotic polar solvents which can be employed are N-methylpyrrolidone, dimethylformamide, tetrahydrofuran, dioxane, dialkyl ethers, glycol ethers, ketones and/or esters.

Other solvents which can be employed are halogenated hydrocarbons, aliphatic, cycloaliphatic and/or aromatic hydrocarbons, individually or as mixtures.

The reaction in the first reaction step, preferably takes place at temperatures between −10 and +200° C.

The reaction particularly preferably takes place at temperatures from 70 to 130° C.

The reaction in the second reaction step preferably takes place at temperatures from 0 to 200° C.

This reaction particularly preferably takes place at temperatures of from 100 to 180° C.

The invention also relates to the use of the novel epoxy resin mixtures in moldings, coatings or laminates.

Finally, the invention relates to prepregs and laminates based on inorganic or organic reinforcing materials in the form of fibers, nonwovens or woven fabrics, produced from novel epoxy resin mixtures.

The phosphorus compounds can be prepared, as described in EP 665 237, by reacting phosphine oxides with fumaric, maleic or itaconic esters and then hydrolyzing the esters with acids.

The halogen-free epoxy compounds employed in accordance with the invention (also referred to below as polyepoxide compounds) may be saturated or unsaturated and may be aliphatic, cycloaliphatic, aromatic and/or heterocyclic. They may, furthermore, include substituents which do not give rise, under the conditions of mixing or of reaction, to disruptive side reactions, examples being alkyl or aryl substituents, ether groups or the like. It is also possible to use mixtures of different polyepoxide compounds. The mean molecular weight $M_n$ of these polyepoxide compounds can be up to about 9000, but is generally from about 150 to 4000.

These polyepoxide compounds are, for example, polyglycidyl ethers based on polyhydric, preferably dihydric alcohols, phenols, hydrogenation products of these phenols and/or on novolaks (reaction products of mono- or polyhydric phenols, such as phenol and/or cresols, aldehydes, especially formaldehyde in the presence of acidic catalysts), which are obtained in a known manner, for example by reacting the respective polyols with epichlorohydrin.

Examples of polyhydric phenols that can be mentioned here are: resorcinol, hydroquinone, 2,2-bis(4-hydroxyphenyl)-propane (bisphenol A), isomer mixtures of dihydroxydiphenylmethane (bisphenol F), 4,4'-dihydroxydiphenylcyclohexane, 4,4'-dihydroxy-3,3'-dimethydiphenylpropane, 4,4'-dihydroxybiphenyl, 4,4'-dihydroxybenzophenone, 1,1-bis(4-hydroxyphenyl)ethane, 1,1'-bis(4-hydroxyphenyl) isobutane, 2,2-bis(4-hydroxy-tert-butylphenyl)-propane, bis(2-hydroxynaphthyl) methane, 1,5-dihydroxy-naphthalene, tris(4-hydroxyphenyl) methane, 1,1'-bis(4-hydroxyphenyl) ether. Bisphenol A and bisphenol F are preferred in this context.

Also suitable as polyepoxide compound are the polyglycidyl ethers of polyhydric aliphatic alcohols. Examples of such polyhydric alcohols that may be mentioned are 1,4-butanediol, 1,6-hexanediol, polyalkylene glycols, glycerol, trimethylolpropane, 2,2-bis(4-hydroxycyclohexyl)propane and pentaerythritol.

Further suitable polyepoxide compounds are (poly) glycidyl esters, which are obtained by reacting epichlorohydrin or similar epoxy compounds with an aliphatic, cycloaliphatic or aromatic polycarboxylic acid, such as oxalic acid, adipic acid, glutaric acid, phthalic, isophthalic, terephthalic, tetrahydrophthalic or hexahydrophthalic acid, 2,6-naphthalenedicarboxylic acid and dimerized fatty acids. Examples thereof are diglycidyl terephthalate and diglycidyl hexahydrophthalate.

Polyepoxide compounds which comprise the epoxide groups in random distribution over the molecule chain and which can be prepared by emulsion copolymerization using olefinically unsaturated compounds containing these epoxide groups, for example glycidyl esters of acrylic or methacrylic acid, can also be employed with advantage in some cases.

Examples of further polyepoxide compounds which can be used are those based on heterocyclic ring systems, such as, for example, hydantoin epoxy resins, triglycidyl isocyanurate and/or its oligomers, triglycidyl-p-aminophenol, triglycidyl-p-aminodiphenyl ether, tetraglycidyldiaminodiphenylmethane, tetraglycidyldiaminodiphenyl ether, tetrakis(4-glycidyloxyphenyl)ethane, urazole epoxides, uracil epoxides and oxazolidinone-modified epoxy resins. Other examples are polyepoxides based on aromatic amines, such as aniline, for example N,N-diglycidylaniline, diaminodiphenylmethane and N,N'-dimethylaminodiphenylmethane or N,N'-dimethylaminodiphenyl sulfone. Further suitable polyepoxide compounds are described in the "Handbook of Epoxy Resins" by Henry Lee and Kris Neville, McGraw-Hill Book Company, 1967, in the monograph by Henry Lee "Epoxy Resins", American Chemical Society, 1970, in Wagner/Sarx, "Lackkunstharze", Carl Hanser Verlag (1971), 5th edition, 174 ff., in "Angew. Makromol Chemie", Vol. 44 (1975) pages 151 to 163, in DE 27 57 733 A1 and in EP 0 384 939 A1, which are incorporated by reference.

Polyepoxide compounds that are employed with preference are bisglycidyl ethers based on bisphenol A, bisphenol F and bisphenol S (reaction products of these bisphenols and epichloro(halo)hydrin) or oligomers thereof, polyglycidyl ethers of phenol-formaldehyde and/or cresol-formaldehyde novolaks, and also diglycidyl esters of phthalic, isophthalic, terephthalic, tetrahydrophthalic and/or hexahydrophthalic acid and of trimellitic acid, N-glycidyl compounds of aromatic amines and heterocyclic nitrogen bases, such as N,N-diglycidylaniline, N,N,O-triglycidyl-p-aminophenol, triglycidyl isocyanurate and N,N,N'N'-tetraglycidylbis(p-aminophenyl)methane, hydantoin epoxy resins and aracid epoxy resins, and also di- and polyglycidyl compounds of polyhydric aliphatic alcohols such as 1,4-butanediol, trimethylolpropane and polyalkylene glycols. In addition, oxazolidinone-modified epoxy resins are also suitable. Compounds of this kind are already known (see "Angew. Makromol. Chem." Vol. 44 (1975), pages 151 to 163, and also US-A 3 334 110); and an example thereof which may be mentioned is the reaction product of bisphenol A diglycidyl ether with diphenylmethane diisocyanate (in the presence of an appropriate accelerator). In the context of the preparation of the novel coating composition, the polyepoxy resins can be present individually or in a mixture.

The term "curing" as used herein denotes the conversion of the soluble, meltable polyepoxides to solid, insoluble and infusible, three-dimensionally crosslinked products, generally with simultaneous shaping, to give, for instance, impregnated structures, coatings and adhesive bonds.

Examples of hardeners which can be employed are aliphatic, cycloaliphatic, aromatic and heterocyclic amines, such as bis(4-aminophenyl)methane, aniline-formaldehyde resins, bis(4-aminophenyl) sulfone, ethylenediamine, 1,3-propanediamine, hexamethylenediamine, diethylenetriamine, triethylenetetramine, 2,2,4-trimethyl-1, 6-hexanediamine, m-xylylenediamine, bis(4-aminocyclohexyl)methane, 2,2-bis(4-aminocyclohexyl) propane, 3-aminomethyl-3,5,5-trimethylcyclohexylamine (isophoronediamine), polyamidoamines, polyphenols, such as hydroquinone, resorcinol, 2,2-bis(4-hydroxyphenyl) propane (bisphenol A) and phenol-aldehyde resins, polycarboxylic acids and their anhydrides, for example phthalic anhydride, tetrahydrophthalic anhydride, hexahydrophthalic anhydride and pyromellitic dianhydride. In addition it is also possible to use catalytic curing agents, such as cyanoguanidines, or Friedel-Crafts catalysts, such as boron trifluroide.

If amines are used as curing agents, they are normally employed in an amount of from 0.75 to 1.25 equivalents per epoxide equivalent. In the case of polycarboxylic acids or their anhydrides, from 0.4 to 1.1 equivalents are used per epoxide equivalent.

Suitable accelerators are principally imidazole derivatives, examples being 2-methylimidazole, 2-phenylimidazole and 2-heptadecylimidazole; also suitable are phosphines, metal soaps and acetylacetonates.

Examples of suitable reactive diluents are mono- or polyfunctional alcohols of low molecular mass, which are reacted with epichlorohydrin.

By varying the ratio of equivalents of polyepoxide compounds to phosphorus-containing dicarboxylic acids or phosphorus-containing carboxylic anhydrides it is possible to adjust the phosphorus content of the novel resin. The ratio of equivalents is preferably between 1:0.1 and 1:0.8 and, with particular preference, between 1:0.1 and 1:0.4. The reaction of the epoxy resin with a phosphorus-containing dicarboxylic acid or a phosphorus-containing carboxylic anhydride gives a still meltable and/or soluble, phosphorus-modified epoxy resin which is storage-stable, even in solution if appropriate, and is easy to handle.

If solvents are employed, they are aprotic and preferably polar. Examples of such are:

N-methylpyrrolidone, dimethylformamide, ethers, such as diethyl ether, tetrahydrofuran, dioxane, ethylglycol ethers, propylene glycol ethers, butylglycol ethers of monoalcohols having an optionally branched alkyl radical of 1 to 6 carbon atoms.

Examples of other solvents are ketones, such as acetone, methyl ethyl ketone, methyl isopropyl ketone, methyl isobutyl ketone, cyclohexanone and the like, although esters, such as ethyl acetate, butyl acetate, ethylene glycol acetate and methoxypropyl acetate, can also be employed.

Further suitable solvents are halogenated hydrocarbons and also cycloaliphatic and/or aromatic hydrocarbons; among these, preference is given to hexane, heptane, cyclohexane, toluene and dixylenes. It is possible to employ these solvents individually or in a mixture.

The epoxy resin molding compositions are preferably reinforced by means of glass cloth or glass fibers. The epoxy resin molding compositions can also be equipped with fillers, such as quartz flour or aluminum oxide hydrate.

The novel epoxy resin molding compositions can be used for surface coating. They can be used for the encapsulation of electrical components, for laminates and for adhesives.

The invention is illustrated below by means of examples. In Examples 1–4, a phosphorus compound of formula (III) was used:

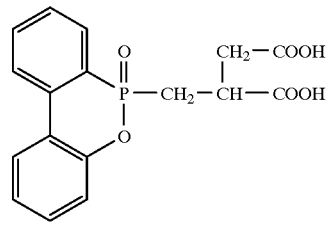
(III)

Preparation of the Phosphorus-Modified Epoxy Resins

EXAMPLE 1

In a 250 ml five-necked flask fitted with reflux condenser, stirrer shaft, thermometer and gas inlet, 100 g of a bisphenol A bisglycidyl ether having an epoxide value of 0.55 mol/100 g (®Beckopox EP 140, Hoechst AG) and 46.9 g (0.135 mol) of the phosphorus compound of formula III are heated with stirring to not more than 150° C. After 30 minutes, a clear melt has formed. After stirring at 150° C. for one hour more, the melt is left to cool and then subjected to the action of a mortar. 146 g of a white powder are obtained, having an epoxide value of 0.18 mol/100 g and a phosphorus content of 2.85% by weight.

EXAMPLE 2

In a 250 ml five-necked flask fitted with reflux condenser, stirrer shaft, thermometer and gas inlet, 100 g of a bisphenol A bisglycidyl ether having an epoxide value of 0.55 mol/100 g (®Beckopox EP 140, Hoechst AG) and 64.3 g (0.19 mol) of the phosphorus compound of formula III are heated with stirring to not more than 150° C. After 30 minutes, a clear melt has formed. After stirring at 150° C. for one hour more, the melt is left to cool and then subjected to the action of a mortar. 164 g of a white powder are obtained, having an epoxide value of 0.13 mol/100 g and a phosphorus content of 3.47% by weight.

EXAMPLE 3

In a 250 ml five-necked flask fitted with reflux condenser, stirrer shaft, thermometer and gas inlet, 100 g of a bisphenol A bisglycidyl ether having an epoxide value of 0.55 mol/100 g (®Beckopox EP 140, Hoechst AG) and 46.9 g (0.135 mol) of the phosphorus compound of formula III are heated with stirring to not more than 130° C. 40 ml of isobutyl methyl ketone are added over the course of 2.5 h. The clear solution is then stirred at 120° C. for 1 h more. 177 g of a viscous solution (83% strength) are obtained, having an epoxide value of 0.17 mol/100 g and a phosphorus content of 2.37% by weight.

EXAMPLE 4

In a 250 ml five-necked flask fitted with reflux condenser, stirrer shaft, thermometer and gas inlet, 100 g of a bisphenol A bisglycidyl ether having an epoxide value of 0.55 mol/100 g (®Beckopox EP 140, Hoechst AG) and 46.9 g (0.135 mol) of the phosphorus compound of formula III are heated with stirring to not more than 150° C. As the homogeneous reaction mixture is being cooled, 36.7 g of methyl ethyl ketone are added. 195 g of a viscous solution (75% strength) are obtained, having an epoxide value of 0.11 mol/100 g and a phosphorus content of 2.15% by weight.

EXAMPLE 5
(with dimethylphosphinylmethylsuccinic acid (IV))

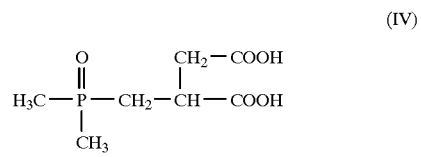

In a 250 ml five-necked flask fitted with reflux condenser, stirrer shaft, thermometer and gas inlet, 100 g of a bisphenol A bisglycidyl ether having an epoxide value of 0.55 mol/100 g (®Beckopox EP 140, Hoechst AG) and 29 g (0.135 mol) of the phosphorus compound of formula (IV) are stirred at 120° C. for 90 minutes and at 140° C. for 30 minutes. The clear melt is cooled and then subjected to the action of a mortar. 129 g of a white powder are obtained, having an epoxide value of 0.19 mol/g and a phosphorus content of 3.3% by weight.

EXAMPLE 6
(with diphenylphosphinylmethylsuccinic acid (V))

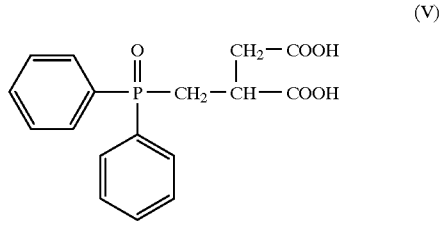

In a 250 ml five-necked flask fitted with reflux condenser, stirrer shaft, thermometer and gas inlet, 100 g of a bisphenol A bisglycidyl ether having an epoxide value of 0.55 mol/100 g (®Beckopox EP 140, Hoechst AG) and 43 g (0.135 mol) of the phosphorus compound of formula (V) are stirred at 120° C. for 90 minutes and at 140° C. for 30 minutes. The clear melt is cooled and then subjected to the action of a mortar. 129 g of a white powder are obtained, having an epoxide value of 0.19 mol/g and a phosphorus content of 2.8% by weight.

Preparation of the Epoxy Resin Molding Compositions

EXAMPLE 7

100 g of phosphorus-modified epoxy resin from Example 1 are melted at 120° C. and mixed thoroughly with 2.5 g of micronized dicyandiamide (®Dyhard 100 SF, SKW Trostberg AG) and 0.2 g of imidazole accelerator (®Dyhard MI, SKW Trostberg AG), and the mixture is cured in a Teflon mold measuring 200×200×2 mm in a drying oven at 150–180° C. for 4 h. Test specimens measuring 127 mm in length and 12.7 mm in width were sawn from this molded composition.

EXAMPLE 8

140 g of phosphorus-modified epoxy resin from Example 5 are melted at 120° C. and mixed thoroughly with 3.5 g of micronized dicyandiamide (®Dyhard 100 SF, SKW Trostberg AG) and 0.3 g of imidazole accelerator (®Dyhard MI, SKW Trostberg AG), and the mixture is cured in a Teflon mold measuring 200×200×2 mm in a drying oven at 150–180° C. for 4 h. Test specimens measuring 127 mm in length and 12.7 mm in width were sawn from this molded composition.

EXAMPLE 9

120 g of phosphorus-modified epoxy resin from Example 6 are melted at 120° C. and mixed thoroughly with 3.3 g of micronized dicyandiamide (®Dyhard 100 SF, SKW Trostberg AG) and 0.3 g of imidazole accelerator (®Dyhard MI, SKW Trostberg AG), and the mixture is cured in a Teflon mold measuring 200×200×2 mm in a drying oven at 150–180° C. for 4 h. Test specimens measuring 127 mm in length and 12.7 mm in width were sawn from this molded composition.

EXAMPLE 10

100 g of phosphorus-modified epoxy resin from Example 1 are melted at 120° C. and mixed thoroughly with 32 g of methylcyclohexane dicarboxyl anhydride and 0.4 g of benzyldimethylamine and the mixture is cured in a Teflon mold measuring 200×200×2 mm in a drying oven at 120–180° C. for 4 h. Test specimens measuring 127 mm in length and 12.7 mm in width were sawn from this molded composition.

EXAMPLE 11
(Comparison Example)

150 g of bisphenol A bisglycidyl ether (®Beckopox EP 140) having an epoxide value of 0.53 mol/100 g are melted at 120° C. and mixed thoroughly with 6.9 g of micronized dicyandiamide (®Dyhard 100 SF, SKW Trostberg AG) and 0.3 g of imidazole accelerator (®Dyhard MI, methylimidazole, SKW Trostberg AG), and the mixture is cured in a Teflon mold measuring 200×200×2 mm in a drying oven at 150–180° C. for 4 h. Test specimens measuring 127 mm in length and 12.7 mm in width were sawn from this molded composition.

The test of fire behavior was carried out in accordance with the directions of Underwriters Laboratories "Test for Flammability of Plastic Materials—UL 94" in the version of 02.05.1975 on test specimens measuring 127 mm in length, 12.7 mm width and 2 mm in thickness. The oxygen index was determined in an apparatus in accordance with ASTM-D 2863-74.

TABLE 1 shows the results of the oxygen index measurements and of the fire tests in accordance with UL 94

| Epoxy resin molding composition | Oxygen index | After burning time | UL 94 Classification |
|---|---|---|---|
| Example 7 | 30.2 | <1', <1' | V-0 |
| Example 8 | 29.4 | <1', <1' | V-0 |
| Example 9 | 29.5 | <1', <2' | V-0 |
| Example 10 | 27.5 | <1', <5' | V-0 |
| Example 11 (Comparison Example) | 20.5 | burnt up | n.c.* | n.c.*:not classified

We claim:
1. A flame resistant epoxy resin mixture comprising the reaction product of an epoxy resin and a phosphorus-containing compound in a ratio of 1.0 equivalent of said epoxy resin to 0.1 to 0.4 equivalent of said phosphorus-containing compound, and a hardener other than said phosphorus-containing compound, wherein the phosphorus-containing compound is represented by the formula I or II

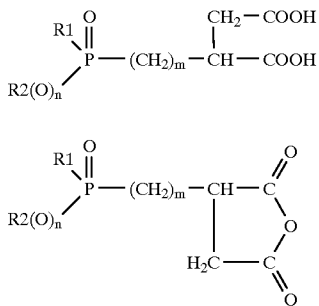

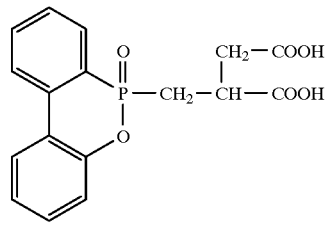

In which R1 and R2 are identical or different and are straight-chain or branched alkyl radical of 1 to 8 carbon atoms, a cyclohexyl, cyclopentyl or aryl radical or an alkyl- or alkoxyalkyl-substituted alkyl radical of 1 to 18 carbon atoms, it also being possible for R1 and R2, together with the P-atom, to form a ring, and m and n are 0 or 1.

2. A flame-resistant epoxy resin mixture as claimed in claim 1, which contains from 10 to 100 parts by weight of phosphorus-containing compound of the formula I or II per 100 parts by weight of epoxy resin, and wherein the overall weight ratio of epoxy resin and phosphorus-containing compound of formula I or II to hardener is 1:1 to 10:1.

3. A flame-resistant epoxy resin mixture as claimed in claim 1, which is free from halogen.

4. A flame-resistant epoxy resin mixture as claimed in claim 1, which contains from 5 to 300 parts by weight of fillers.

5. A flame-resistant epoxy resin mixture as claimed in claim 1, which contains from 0.5 to 13% by weight of phosphorus.

6. A flame-resistant epoxy resin mixture as claimed in claim 1, which contains from 1 to 6% by weight of phosphorus.

7. A flame-resistant epoxy resin mixture as claimed in claim 1, which further comprises an accelerator.

8. A flame-resistant epoxy resin mixture as claimed in claim 1, which comprises a compound of the formula III

* * * * *